US009535285B2

(12) United States Patent
Zhang et al.

(10) Patent No.: US 9,535,285 B2
(45) Date of Patent: Jan. 3, 2017

(54) DIRECT TYPE BACKLIGHT MODULE AND DISPLAY APPARATUS

(71) Applicants: BOE TECHNOLOGY GROUP CO., LTD., Beijing (CN); BEIJING BOE VISION-ELECTRONIC TECHNOLOGY CO., LTD., Beijing (CN)

(72) Inventors: Xiao Zhang, Beijing (CN); Jianmin He, Beijing (CN)

(73) Assignees: BOE TECHNOLOGY GROUP CO., LTD., Beijing (CN); BEIJING BOE VISION-ELECTRONIC TECHNOLOGY CO., LTD., Beijing (CN)

( * ) Notice: Subject to any disclaimer, the term of this patent is extended or adjusted under 35 U.S.C. 154(b) by 48 days.

(21) Appl. No.: 14/598,167

(22) Filed: Jan. 15, 2015

(65) Prior Publication Data
US 2015/0316819 A1    Nov. 5, 2015

(30) Foreign Application Priority Data

May 4, 2014    (CN) .......................... 2014 1 0185077

(51) Int. Cl.
*F21V 8/00*    (2006.01)
*G02F 1/1335*    (2006.01)

(52) U.S. Cl.
CPC ......... *G02F 1/133603* (2013.01); *G02B 6/001* (2013.01); *G02F 1/133524* (2013.01); *G02F 1/133606* (2013.01)

(58) Field of Classification Search
CPC ..................................................... G02B 6/001
See application file for complete search history.

(56) References Cited

U.S. PATENT DOCUMENTS 4,761,047 A * 8/1988 Mori .................... A61N 5/0616
                                                                36/137
6,104,371 A * 8/2000 Wang ...................... G02B 6/001
                                                                345/102
(Continued)

FOREIGN PATENT DOCUMENTS

CN    201335298    10/2009
CN    103090271    5/2013

OTHER PUBLICATIONS

Chinese Office Action with English Language Translation, dated Oct. 10, 2015, Chinese Application No. 2014101850770.

*Primary Examiner* — Renee Chavez
*Assistant Examiner* — Eric T Eide
(74) *Attorney, Agent, or Firm* — Blakely Sokoloff Taylor & Zafman LLP

(57) ABSTRACT

The present disclosure provides a direct-type backlight module and a display apparatus. The direct-type backlight module may comprise: a backplane; a plurality of LED lamps distributed in an array which are positioned on the backplane; a diffusion plate above the plurality of LED lamps; and multiple optical fibers connecting two adjacent LED lamps of the plurality of LED lamps, each optical fiber being provided with a plurality of light transmission openings distributed at intervals towards the diffusion plate along its extension direction. Wherein part of light emitted from each LED lamp can be propagated along the optical fiber and transmitted to the diffusion plate via the light transmission openings. The direct-type backlight module directs part of the light emitted from the LED lamps through the plurality of light transmission openings to the diffusion plate using the optical fibers, which changes the LED lamps in the form of point light sources into area light sources. Therefore, the direct-type backlight modules provided in the present disclosure can obtain uniform illumination at the same time of (Continued)

reducing the number of LED lamps, without increasing the light mixing distance of the backlight modules, thereby improving light availability.

9 Claims, 5 Drawing Sheets

(56) References Cited

U.S. PATENT DOCUMENTS

| | | | | |
|---|---|---|---|---|
| 2006/0044824 | A1* | 3/2006 | Chen | G02B 6/001 362/583 |
| 2006/0194487 | A1* | 8/2006 | Ouderkirk | B82Y 20/00 442/59 |
| 2008/0198620 | A1* | 8/2008 | Bihr | G02B 6/0006 362/603 |
| 2009/0027587 | A1* | 1/2009 | Itoh | G02B 6/001 349/61 |
| 2010/0283376 | A1* | 11/2010 | Kanade | G02B 6/001 313/483 |
| 2013/0135900 | A1* | 5/2013 | Ke | G02B 6/0068 362/612 |
| 2014/0049983 | A1* | 2/2014 | Nichol | G02B 6/0018 362/610 |
| 2014/0098558 | A1* | 4/2014 | Vasylyev | G02B 6/0036 362/551 |
| 2015/0160394 | A1* | 6/2015 | Nakano | G02B 6/001 349/65 |
| 2015/0260370 | A1* | 9/2015 | Freier | G02B 6/001 362/224 |

* cited by examiner

-- Prior Art --

-- Prior Art --

DIRECT TYPE BACKLIGHT MODULE AND DISPLAY APPARATUS

RELATED APPLICATIONS

The present application claims the benefit of Chinese Patent Application No. 201410185077.0, filed May 4, 2014, the entire disclosure of which is incorporated herein by reference.

FIELD OF THE INVENTION

The present disclosure relates to display technologies, in particular, to a direct-type backlight module and display apparatus.

BACKGROUND OF THE INVENTION

Liquid crystal display apparatus is a passive light-emitting device, which does not emit light itself and requires a backlight module to provide its liquid crystal panel with a light source such that it displays images. Since the backlight module used in the liquid crystal panel has the characteristics of being light and thin and saving power, it is widely applied in display apparatuses.

At present, backlight module techniques mainly used by the liquid crystal display apparatus are Cold Cathode Fluorescent Lamp (CCFL) and Light Emitting Diodes (LED).

Since LED backlight module has many advantages such as high luminance, high color purity, long life, good reliability, being free of mercury pollution, and so on, there is a gradual increase in the proportion thereof in backlight modules.

LED backlight modules can be classified into direct-type and side-light type in the light of optical structure. Light sources are placed at side faces of the panel of the side-light type LED backlight module, whereas for the direct-type, light sources are placed below the panel. As shown in FIGS. 1 and 2, FIG. 1 is a schematic diagram of a direct-type backlight structure in the prior art; FIG. 2 is a manner of arrangement of LED lamps in the direct-type backlight in the prior art. The direct-type LED backlight module mainly comprises: backplane 01, circuit board 02 within the backplane 01, LED lamps 03 distributed at intervals, bottom reflection sheet 04, diffusion plate 05, optical diaphragm 06, side reflection sheet 07, prism sheet 08, and the like.

The light emitted from the LED lamps is a point light source. Due to light-emitting angles of the light, it may easily occur that the light intensity of the backlight module in a certain angle direction is relatively strong, while the light intensity thereof in another angle direction is relatively weak.

In the prior art, uniform illumination is usually achieved by increasing the number of LED lamps or increasing the light mixing distance (which usually refers to the distance H from the top of the bottom reflection sheet 04 to the bottom of the diffusion plate 05) of the backlight module. This leads to an increase in the cost or thickness of the backlight module. Furthermore, when there are a fixed number of LED lamps in the backlight system, if the thickness of the backlight module is reduced, non-uniformity of the light incident on the display panel would be caused such that obvious light spots will appear on the display apparatus.

SUMMARY OF THE INVENTION

The present disclosure provides a direct-type backlight module, which can obtain uniform illumination at the same time of reducing the number of LED lamps without increasing the light mixing distance of the backlight module, thereby improving light availability.

In addition, the present disclosure also provides a display apparatus which has good display effect and whose integral thickness is relatively thin.

In order to alleviate or avoid the above-mentioned problem, the present disclosure provides the following technical solutions.

One embodiment of the present invention provides a direct-type backlight module. The direct-type backlight module may comprise a backplane, a plurality of LED lamps distributed in an array which are positioned on the backplane, a diffusion plate above the plurality of LED lamps, and multiple optical fibers connecting two adjacent LED lamps of the plurality of LED lamps. Each optical fiber of the multiple optical fibers may be provided with a plurality of light transmission openings distributed at intervals towards the diffusion plate along its extension direction, wherein part of light emitted from each LED lamp can be propagated along the optical fiber and transmitted to the diffusion plate via the light transmission openings.

LED lamps have certain light-emitting angles, so when they are applied to the direct-type backlight module, part of the light emitted from the LED lamps may not irradiate the diffusion plate or light intensity of the light irradiating the diffusion plate may be weak. The direct-type backlight module provided in the present disclosure directs part of the light emitted from the LED lamps through a plurality of light transmission openings to the diffusion plate using multiple optical fibers, which can change the LED lamps in the form of point light sources into area light sources.

Accordingly, the direct-type backlight module provided in the present disclosure can obtain uniform illumination at the same time of reducing the number of LED lamps without increasing the light mixing distance of the backlight module, thereby improving light availability.

In some embodiments, each optical fiber may be connected to the LED lamp by an optical coupler. The optical coupler is a device that connects an optical fiber to another optical fiber in a detachable (movable) way, which precisely joins two end faces of the optical fibers such that light energy outputted by a transmitting optical fiber can be coupled into a receiving optical fiber to the utmost extent. In an embodiment, specifically, the optical coupler may be an optical fiber interface disposed at the junction of the LED lamp and the optical fiber, one end of the optical fiber interface is in the interior of a lens of the LED lamp. The optical fiber interface is provided with a converging lens, which can converge most of the light emitted from the LED lamp at the optical fiber interface.

In some embodiments, a quadrilateral area surrounded by any four adjacent LED lamps of the plurality of LED lamps may be provided with at least one optical fiber connecting two LED lamps in a diagonal line direction.

In some embodiments, a quadrilateral area surrounded by any four adjacent LED lamps of the plurality of LED lamps may be provided with three optical fibers, and among said three optical fibers, two optical fibers may respectively connect two pairs of LED lamps in a first direction, and the other optical fiber may connect two LED lamps in a diagonal line direction, wherein the first direction may be parallel to the column direction of the plurality of LED lamps distributed in an array.

In some embodiments, a quadrilateral area surrounded by any four adjacent LED lamps of the plurality of LED lamps may be provided with three optical fibers, and among said three optical fibers, the first optical fiber may connect two LED lamps in a first direction, the second optical fiber may connect two LED lamps in a second direction and the third optical fiber may connect two LED lamps in a diagonal line direction; wherein the first direction and the second direction may be parallel to the row direction of the plurality of LED lamps distributed in an array.

In some embodiments, a quadrilateral area surrounded by any four adjacent LED lamps of the plurality of LED lamps may be provided with five optical fibers, and among said five optical fibers, two optical fibers may respectively connect two pairs of LED lamps in a first direction, one optical fiber may connect two LED lamps in a diagonal line direction, and the other two optical fibers may respectively connect two pairs of LED lamps in a second direction, wherein the first direction may be parallel to the column direction of the plurality of LED lamps distributed in an array, the second direction may be parallel to the row direction of the plurality of LED lamps distributed in an array.

In some embodiments, the plurality of light transmission openings on each optical fiber may be identical in size and are distributed at unequal intervals densely to sparsely from the middle of each optical fiber towards two ends thereof. Since the intensity of light becomes attenuated with the increase in the propagation distance, the light transmission openings may be sparsely distributed at the positions of each optical fiber which are close to the LED lamps along its length direction and may be densely distributed at the middle of each optical fiber in order to achieve uniform illumination.

In some embodiments, the plurality of light transmission openings on each optical fiber may be distributed at equal intervals, and the light transmission openings at the middle of each optical fiber may be larger than those at two ends thereof. Since the intensity of light becomes attenuated with the increase in the propagation distance, in order to achieve uniform illumination, light transmission openings at the positions of each optical fiber which are close to the LED lamps along its length direction may be smaller, and light transmission openings at the middle of each optical fiber may be larger.

In some embodiments, the plurality of light transmission openings distributed at intervals on each optical fiber may have the shape of a circle. Certainly, the light transmission openings may also have the shape of a quadrangle, and so on, which will not be explained in detail here one by one. Circular light transmission openings are convenient to manufacture and light transmitted through the circular light transmission openings has better uniformity.

The present disclosure further provides a display apparatus which may comprise a display screen and may further comprise any one of the aforesaid direct-type backlight modules. Since the direct-type backlight modules can obtain uniform illumination at the same time of reducing the number of LED lamps without increasing the light mixing distances of the backlight modules (i.e. there is no need to increase the thickness of the backlight modules), meanwhile, light emitted by the LED lamps at a non-perpendicular light-emitting angle can also be utilized such that light availability is improved, the display apparatus provided in the present disclosure has good display effect and the integral thickness thereof is relatively thin.

| Reference Signs: | |
|---|---|
| 01 - backplane | 02 - circuit board |
| 03 - LED lamp | 04 - bottom reflection sheet |
| 05 - diffusion plate | 06 - optical diaphragm |
| 07 - side reflection sheet | 08 - prism sheet |
| 1 - backplane | 2 - diffusion plate |
| 3 - LED lamp | 4 - optical fiber |
| 41 - light transmission openings | |

DETAILED DESCRIPTION OF THE INVENTION

The technical solutions of the embodiments of the present invention will be clearly and comprehensively described as follows in combination with the figures of the embodiments of the present invention. Obviously, the embodiments described are only a part of the embodiments of the present invention, rather than all of them. All the other embodiments obtained by those ordinarily skilled in the art based on the embodiments of the present invention without spending any inventive efforts pertain to the scope claimed by the present invention.

Figure 1:
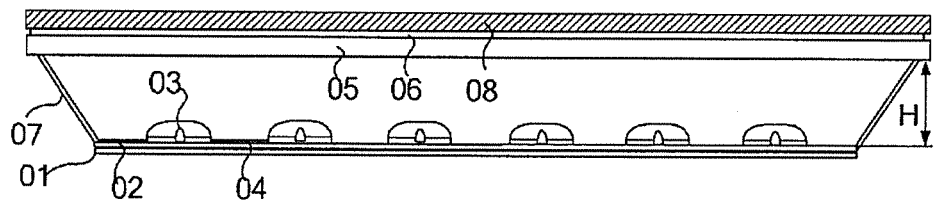
FIG. 1 is a schematic diagram of the structure of a direct-type backlight module in the prior art.
Figure 2:
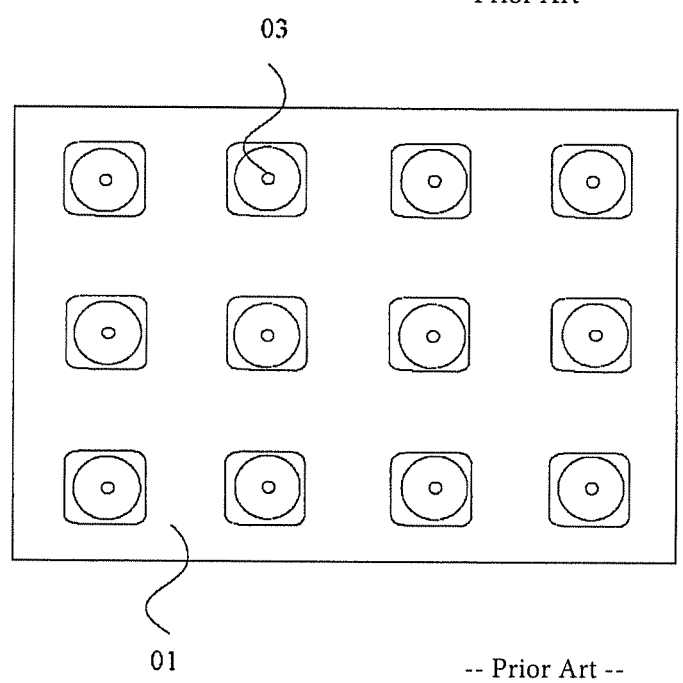
FIG. 2 is a manner of arrangement of LED lamps in a direct-type backlight module in the prior art.
Figure 3:
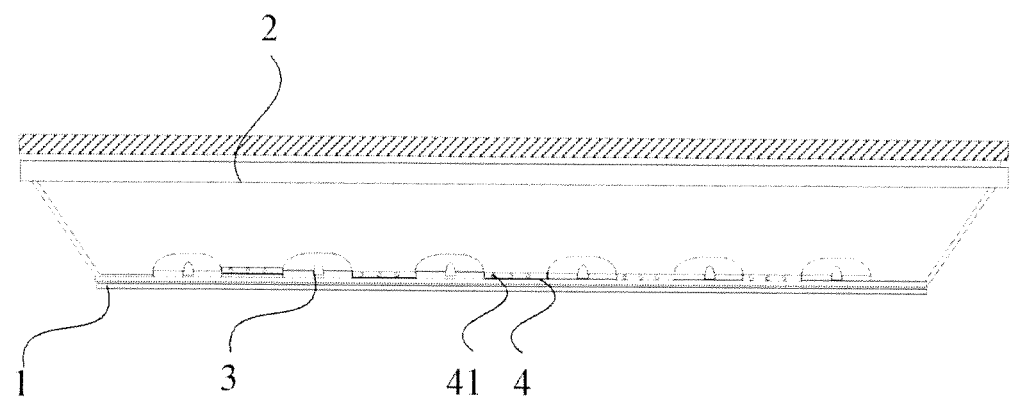
FIG. 3 is a schematic diagram of the structure of a direct-type backlight module provided in one embodiment of the present invention.

As shown in FIG. 3, which is a schematic diagram of the structure of a direct-type backlight module provided in one embodiment of the present invention. The present embodiment provides a direct-type backlight module which may comprise a backplane 1, a plurality of LED lamps 3 distributed in an array which are positioned on the backplane 1, a diffusion plate 2 above the plurality of LED lamps 3, and multiple optical fibers 4 connecting two adjacent LED lamps 3 of the plurality of LED lamps 3. Each optical fiber 4 may be provided with a plurality of light transmission openings 41 distributed at intervals towards the diffusion plate 2 along its extension direction, wherein part of light emitted from the LED lamps 3 can be propagated along the optical fibers 4 and transmitted to the diffusion plate 2 via the light transmission openings 41.

The LED lamps 3 have certain light-emitting angles, so when they are applied to the direct-type backlight module, part of the light emitted from the LED lamps 3 may not irradiate the diffusion plate 2 or light intensity of the light irradiating the diffusion plate 2 may be weak. The direct-type backlight module provided in the present embodiment directs part of the light emitted from the LED lamps 3 through the plurality of light transmission openings 41 of the optical fibers 4 to the diffusion plate 2 using multiple optical fibers 4, which can change the LED lamps 3 in the form of point light sources into area light sources.

Accordingly, the direct-type backlight module provided in the embodiment of the present invention can obtain uniform illumination at the same time of reducing the number of LED lamps without increasing the light mixing distance of the backlight module, thereby improving light availability.

In addition, since the light transmission openings 41 on each optical fiber may not be continuous and the positions thereof may be set based on actual needs, the direct-type backlight module provided in the embodiment of the present invention can achieve the effect of supplementing different light intensities for different areas.

In one embodiment of the present invention, each optical fiber 4 may be connected to the LED lamp 3 by an optical coupler. The optical coupler is a device that connects one optical fiber to another optical fiber in a detachable (movable) way, which precisely joins two end faces of the optical fibers such that light energy outputted by the transmitting optical fiber can be coupled into the receiving optical fiber to the utmost extent, and it is involved in the optical link such that the impact on the system is reduced to minimum. In this embodiment, specifically, the optical coupler may be an optical fiber interface disposed at the junction of the LED lamp and the optical fiber, one end of the optical fiber interface is in the interior of a lens of the LED lamp. The optical fiber interface is provided with a converging lens, which can converge most of the light emitted from the LED lamp at the optical fiber interface.

There are various forms for specific positions of the optical fibers 4 and the distribution shape thereof.

Figure 4A:
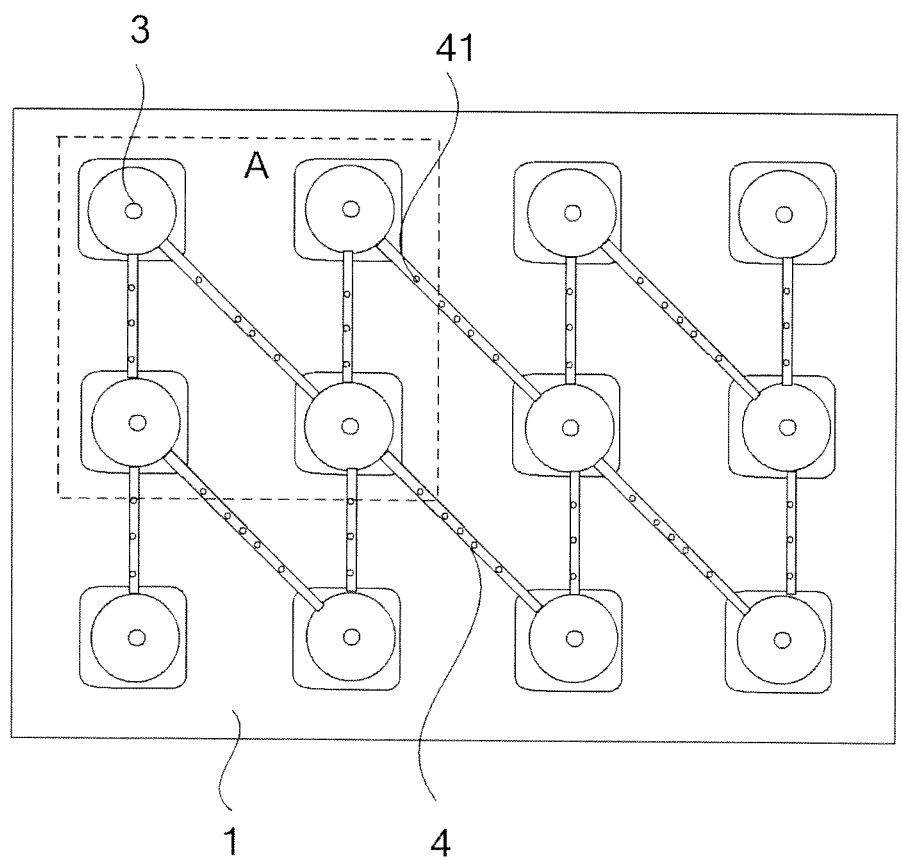
FIG. 4a is a manner of arrangement of optical fibers in a direct-type backlight module provided in one embodiment of the present invention.
Figure 4B:
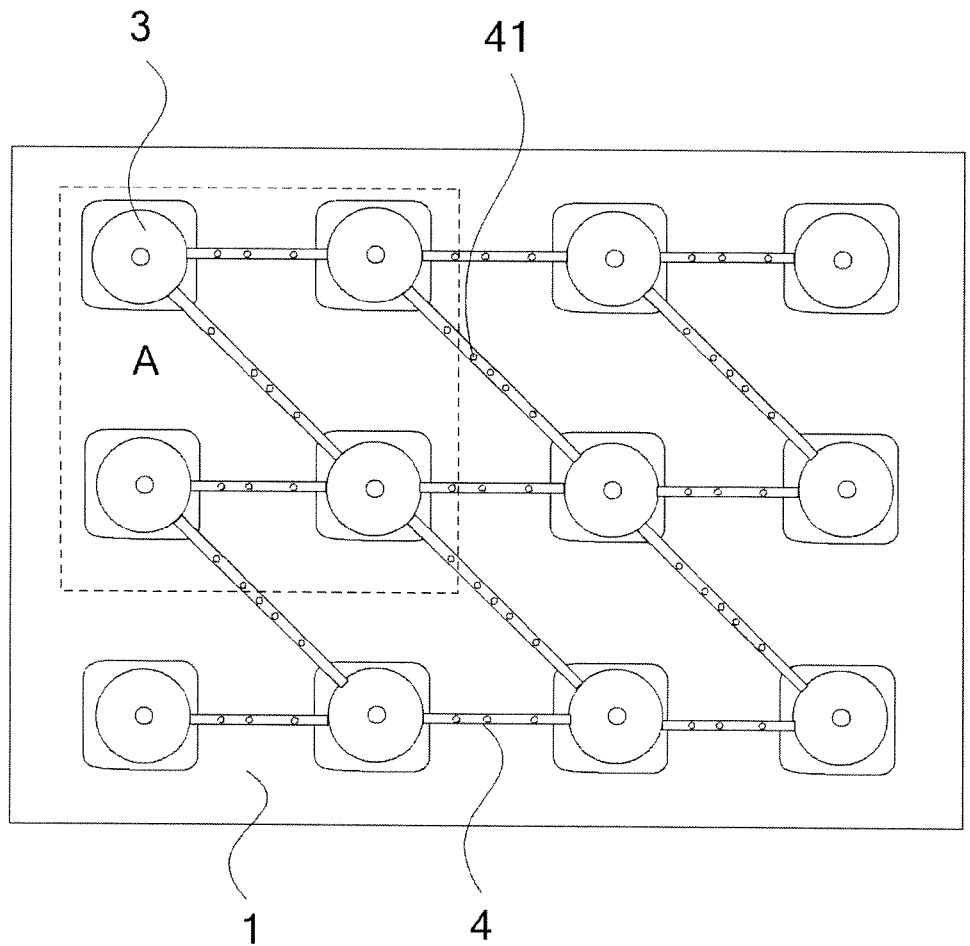
FIG. 4b is a manner of arrangement of optical fibers in a direct-type backlight module provided in another embodiment of the present invention.
Figure 4C:
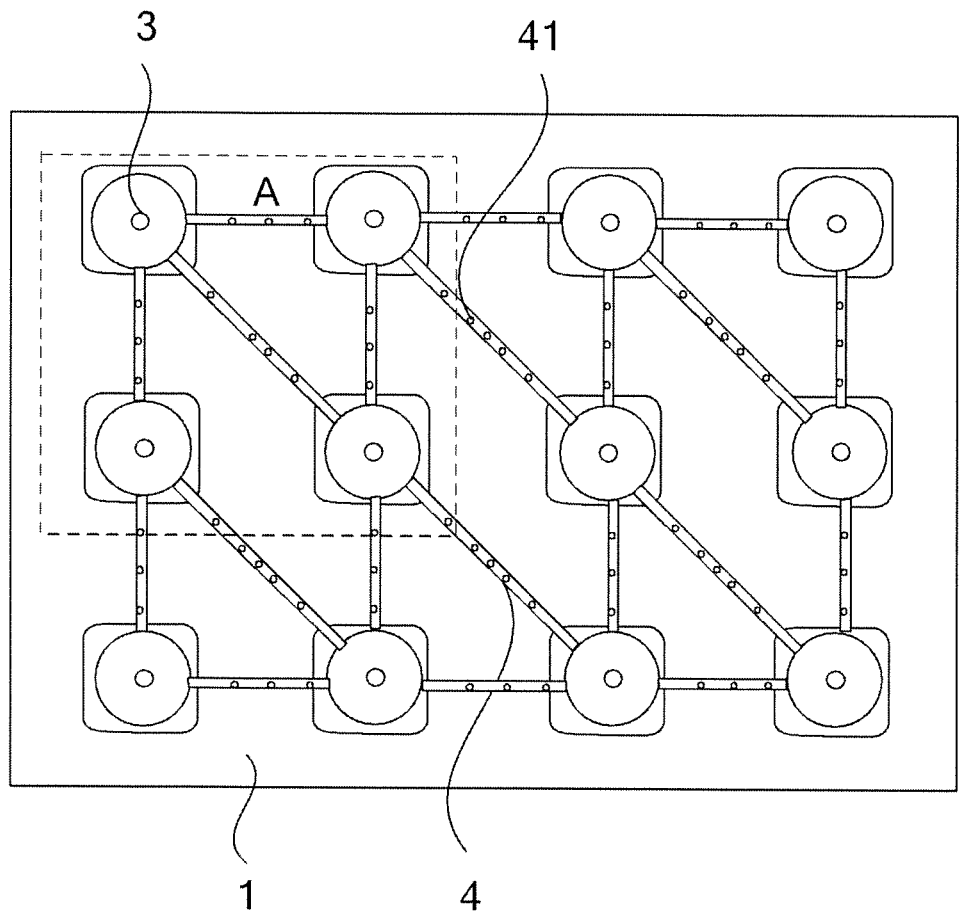
FIG. 4c is a manner of arrangement of optical fibers in a direct-type backlight module provided in a further embodiment of the present invention.
Figure 4D:
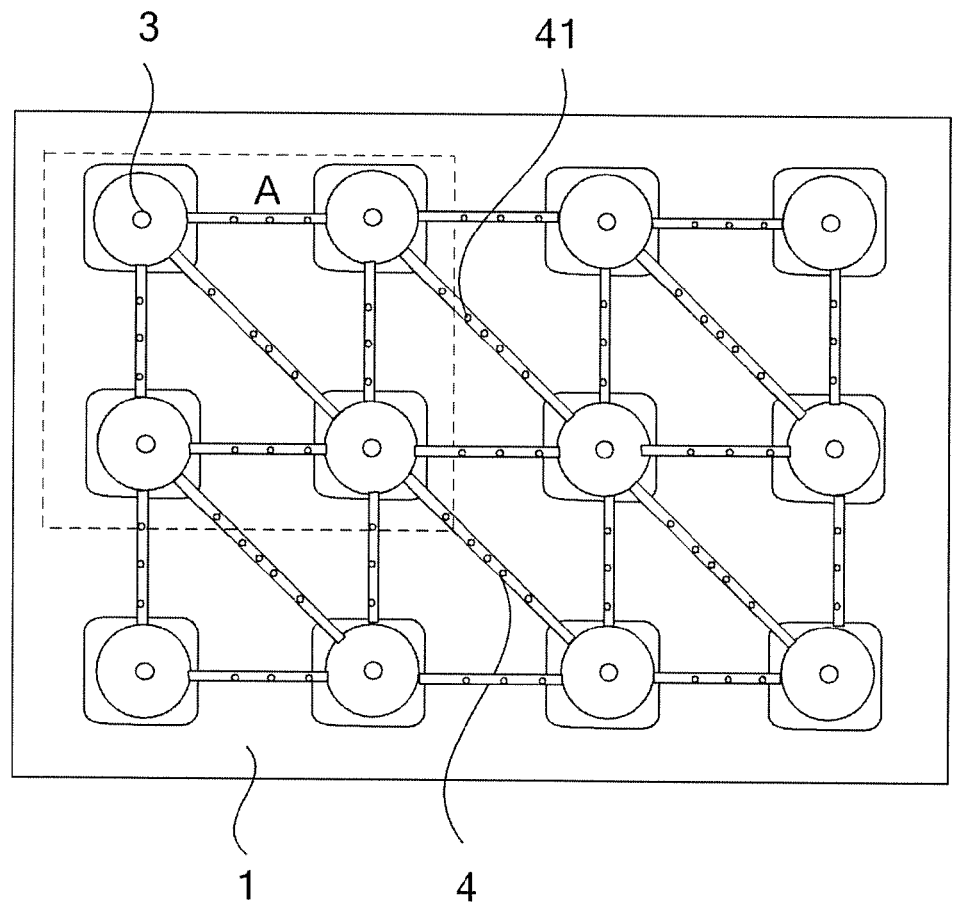
FIG. 4d is a manner of arrangement of optical fibers in a direct-type backlight module provided in a further embodiment of the present invention.

As shown in FIGS. 4a-4d, FIG. 4a is a manner of arrangement of optical fibers in a direct-type backlight module provided in one embodiment of the present invention; FIG. 4b is a manner of arrangement of optical fibers in a direct-type backlight module provided in another embodiment of the present invention; FIG. 4c is a manner of arrangement of optical fibers in a direct-type backlight module provided in a further embodiment of the present invention; FIG. 4d is a manner of arrangement of optical fibers in a direct-type backlight module provided in a further embodiment of the present invention.

A quadrilateral area A surrounded by any four adjacent LED lamps 3 of the plurality of LED lamps 3 may be provided with at least one optical fiber 4 connecting two LED lamps 3 in a diagonal line direction. In order to achieve uniform illumination, an optical fiber 4 may be disposed between two LED lamps 3 that are far apart from each other.

As shown in FIG. 4a, a quadrilateral area A surrounded by any four adjacent LED lamps 3 of the plurality of LED lamps 3 may be provided with three optical fibers 4, and among said three optical fibers 4, two optical fibers 4 may respectively connect two pairs of LED lamps 3 in a first direction, and the other optical fiber 4 may connect two LED lamps 3 in a diagonal line direction; wherein the first direction may be parallel to the column direction of the plurality of LED lamps 3 distributed in an array. In the orientation shown in FIG. 4a, the first direction is namely the vertical direction. Since the spacing between two adjacent LED lamps 3 in the vertical direction may be larger than that between two adjacent LED lamps 3 in the horizontal direction, two pairs of two adjacent LED lamps 3 in the vertical direction may be connected with the optical fibers 4.

As shown in FIG. 4b, a quadrilateral area A surrounded by any four adjacent LED lamps 3 of the plurality of LED lamps 3 may be provided with three optical fibers 4, and among said three optical fibers 4, the first optical fiber 4 may connect two LED lamps 3 in a first direction, the second optical fiber 4 may connect two LED lamps 3 in a second direction and the third optical fiber 4 can connect two LED lamps 3 in a diagonal line direction; wherein the first direction and the second direction may be parallel to the row direction of the plurality of LED lamps 3 distributed in an array.

As shown in FIG. 4c, a quadrilateral area A surrounded by any four adjacent LED lamps 3 of the plurality of LED lamps 3 may be provided with four optical fibers 4, and among said four optical fibers 4, two optical fibers 4 may connect two pairs of LED lamps 3 in a first direction, the third optical fiber 4 may connect two LED lamps 3 in a second direction, and the fourth optical fiber 4 may connect two LED lamps 3 in a diagonal line direction; wherein the first direction may be parallel to the column direction of the plurality of LED lamps 3 distributed in an array and the second direction may be parallel to the row direction of the plurality of LED lamps 3 distributed in an array. In the orientation shown in FIG. 4c, the first direction is the vertical direction and the second direction is the horizontal direction. Since the spacing between two adjacent LED lamps in the vertical direction may be larger than that between two adjacent LED lamps in the horizontal direction, two pairs of two adjacent LED lamps 3 in the vertical direction may be connected with the optical fibers 4.

In another embodiment, as shown in FIG. 4d, a quadrilateral area A surrounded by any four adjacent LED lamps 3 of the plurality of LED lamps 3 may be provided with five optical fibers 4, and among said five optical fibers 4, two optical fibers 4 may respectively connect two pairs of LED lamps 3 in a first direction, one optical fiber 4 may connect two LED lamps 3 in a diagonal line direction, and the other two optical fibers 4 may respectively connect two pairs of LED lamps 3 in a second direction; wherein the first direction may be parallel to the column direction of the plurality of LED lamps 3 distributed in an array and the second direction may be parallel to the row direction of the plurality of LED lamps 3 distributed in an array Of course, manners of arrangement of optical fibers are not limited to the abovementioned ones, other manners will not be explained in detail here one by one.

In one embodiment, each optical fiber 4 may be provided with a plurality of light transmission openings 41 which are identical in size and distributed at unequal intervals densely to sparsely from the middle of the optical fiber 4 towards two ends thereof. Since the intensity of light becomes attenuated with the increase in the propagation distance, the light transmission openings 41 may be sparsely distributed at the positions of each optical fiber 4 which are close to the LED lamps 3 along its length direction and may be densely distributed at the middle of each optical fiber 4 in order to achieve uniform illumination.

In another embodiment, each optical fiber 4 may be provided with a plurality of light transmission openings 41 distributed at equal intervals, and the light transmission openings 41 at the middle of each optical fiber 4 may be larger than those at two ends thereof. Since the intensity of light becomes attenuated with the increase in the propagation distance, in order to achieve uniform illumination, light transmission openings 41 at the positions of each optical fiber 4 which are close to the LED lamps 3 along its length direction may be smaller, and light transmission openings 41 at the middle of each optical fiber 4 may be larger.

In one embodiment, the plurality of light transmission openings 41 distributed at intervals on each optical fiber 4 may have the shape of a circle. Circular light transmission openings are convenient to manufacture and light transmitted through the circular light transmission openings has better uniformity. Of course, the light transmission openings may also have a quadrilateral shape, and so on, which will not be explained in detail here one by one.

Another embodiment of the present invention further provides a display apparatus which may comprise a display screen and may further comprise the direct-type backlight module according to any one of the above embodiments. Since direct-type backlight modules mentioned above can lead to uniform illumination at the same time of reducing the number of LED lamps without increasing the light mixing distances of the backlight modules (i.e. there is no need to increase the thickness of the backlight module), meanwhile, light emitted by the LED lamps at a non-perpendicular light-emitting angle can also be utilized so that light availability is improved, the display apparatus provided in the embodiment of the present invention has good display effect and the integral thickness thereof is relatively thin.

Obviously, those skilled in the art can make various modifications and variations to the embodiments of the present invention without departing from the spirit and scope of the present invention. In this way, if said modifications and variations to the embodiments of the present invention fall within the scopes of the claims of the present invention and equivalent techniques thereof, the present invention also intends to include such modifications and variations.

The invention claimed is:

1. A direct-type backlight module, comprising:
a backplane;
a plurality of LED lamps distributed in an array which are positioned on the backplane;
a diffusion plate above the plurality of LED lamps;
and an optical fiber connecting two adjacent LED lamps of the plurality of LED lamps, the optical fiber being provided with a plurality of light transmission openings distributed at intervals towards the diffusion plate along its extension direction,
wherein part of light emitted from each LED lamp is propagated along the optical fiber and transmitted to the diffusion plate via the light transmission openings
wherein a quadrilateral area surrounded by any four adjacent LED lamps of the plurality of LED lamps is provided with an optical fiber connecting two of said LED lamps in a diagonal line direction.

2. The direct-type backlight module according to claim 1, wherein the optical fiber is connected to the LED lamp by an optical coupler.

3. The direct-type backlight module according to claim 1, wherein a quadrilateral area surrounded by any four adjacent LED lamps of the plurality of LED lamps is provided with three optical fibers, and among said three optical fibers, two optical fibers respectively connect two pairs of LED lamps in a first direction, and the other optical fiber connects two LED lamps in said diagonal line direction, the first direction is parallel to the column direction of the plurality of LED lamps distributed in an array.

4. The direct-type backlight module according to claim 1, wherein a quadrilateral area surrounded by any four adjacent LED lamps of the plurality of LED lamps is provided with three optical fibers, and among said three optical fibers, the first optical fiber connects two LED lamps in a first direction, the second optical fiber connects two LED lamps in a second direction and the third optical fiber connects two LED lamps in said diagonal line direction, the first and second direction are parallel to the row direction of the plurality of LED lamps distributed in an array.

5. The direct-type backlight module according to claim 1, wherein a quadrilateral area surrounded by any four adjacent LED lamps of the plurality of LED lamps is provided with five optical fibers, and among said five optical fibers, two optical fibers respectively connect two pairs of LED lamps in a first direction, one optical fiber connects two LED lamps in said diagonal line direction, and the other two optical fibers respectively connect two pairs of LED lamps in a second direction, the first direction is parallel to the column direction of the plurality of LED lamps distributed in an array, the second direction is parallel to the row direction of the plurality of LED lamps distributed in an array.

6. The direct-type backlight module according to claim 1, wherein the plurality of light transmission openings on the optical fiber are identical in size and are distributed at unequal intervals densely to sparsely from the middle of the optical fiber to two ends thereof.

7. The direct-type backlight module according to claim 1, wherein the plurality of light transmission openings on the optical fiber are distributed at equal intervals, and the light transmission openings at the middle of the optical fiber are larger than those at two ends thereof.

8. The direct-type backlight module according to claim 1, wherein the plurality of light transmission openings distributed at intervals on the optical fiber have the shape of a circle.

9. A display apparatus, comprising:
a display screen;
a backplane;
a plurality of LED lamps distributed in an array which are positioned on the backplane;
a diffusion plate above the plurality of LED lamps;
and an optical fiber connecting two adjacent LED lamps of the plurality of LED lamps, the optical fiber being provided with a plurality of light transmission openings distributed at intervals towards the diffusion plate along its extension direction,
wherein part of light emitted from each LED lamp is propagated along the optical fiber and transmitted to the diffusion plate via the light transmission openings,
wherein a quadrilateral area surrounded by any four adjacent LED lamps of the plurality of LED lamps is provided with at least one optical fiber connecting two LED lamps in a diagonal line direction.

* * * * *